United States Patent [19]
Schrott

[11] Patent Number: 4,789,216
[45] Date of Patent: Dec. 6, 1988

[54] GUIDE DEVICE FOR A LIGHT WAVE CONDUCTOR

[75] Inventor: Werner G. Schrott, Heilbronn, Fed. Rep. of Germany

[73] Assignee: Amphenol Corporation, Wallingford, Conn.

[21] Appl. No.: 424,680

[22] Filed: Sep. 27, 1982

[30] Foreign Application Priority Data

Sep. 25, 1981 [DE] Fed. Rep. of Germany ....... 3138290

[51] Int. Cl.$^4$ ............................ G02B 6/36; G02B 7/26
[52] U.S. Cl. ................... 350/96.20; 350/96.21
[58] Field of Search ................... 350/96.20, 320, 96.21; 339/124, 126 RS

[56] References Cited

U.S. PATENT DOCUMENTS 3,999,837 12/1976 Bowen et al. .................. 350/96.2
4,107,242 8/1978 Runge ........................ 264/1
4,290,668 9/1981 Ellis et al. ..................... 350/96.21
4,291,941 9/1981 Melzer ......................... 350/96.21

FOREIGN PATENT DOCUMENTS 1109306 9/1981 Canada ........................ 88/97.3

Primary Examiner—William L. Sikes
Assistant Examiner—Robert E. Wise
Attorney, Agent, or Firm—Bacon & Thomas

[57] ABSTRACT

A guide device for a optical filament of a light wave conductor. The device has an inlet opening for receiving the filament. A contact surface is provided in the inlet opening thus forming an installation opening. The contact surface is capable of receiving filaments of different diameters. After the filament of a specified diameter is inserted into the guide device, a hardenable material is filled into the inlet and installation openings and the guide device separated adjacent to the filament end.

13 Claims, 2 Drawing Sheets

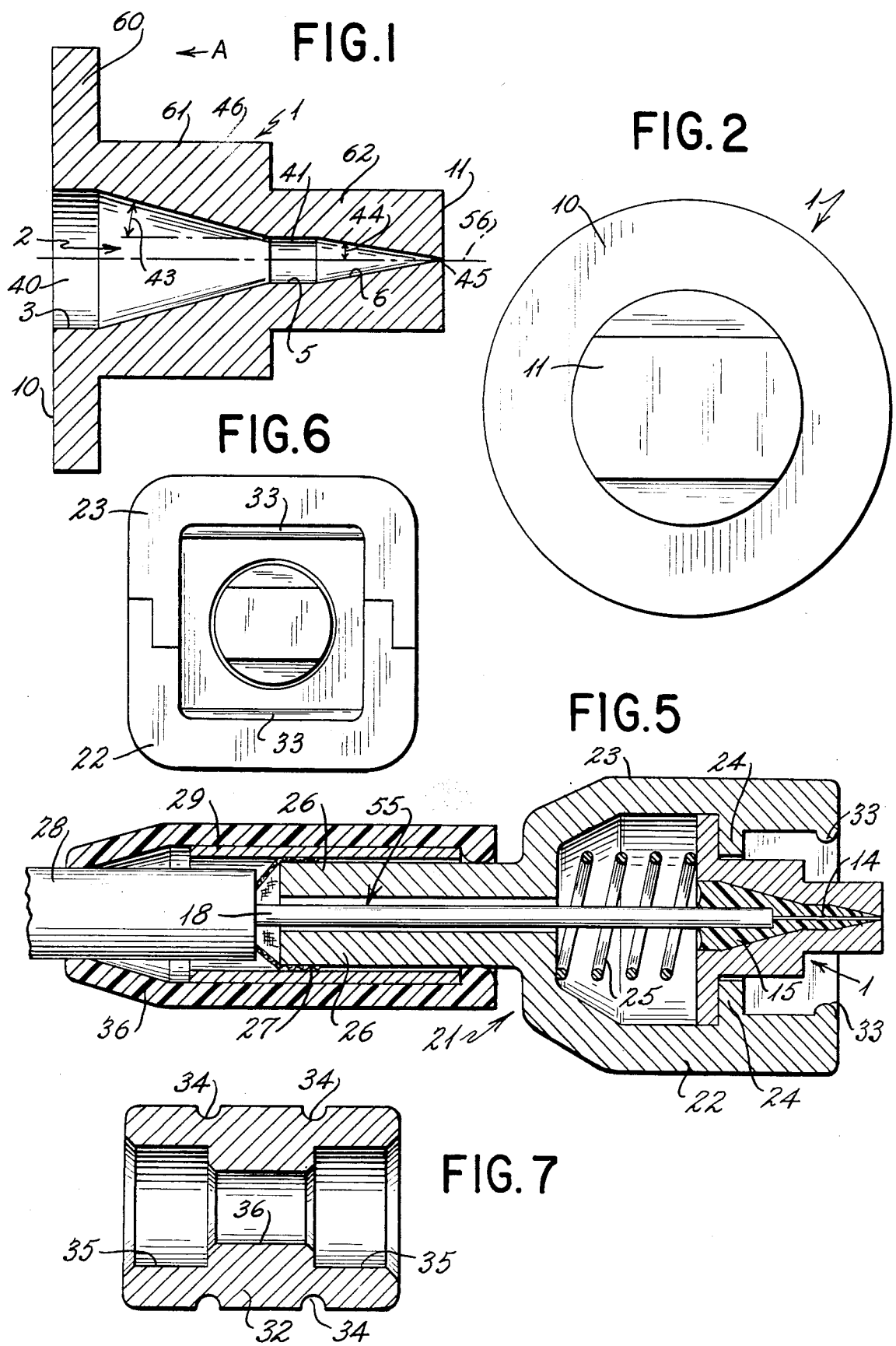

GUIDE DEVICE FOR A LIGHT WAVE CONDUCTOR

BACKGROUND OF THE INVENTION

This invention relates to a holding element, especially a guiding device formed of plastic for mounting the filaments of a light wave conductor and with an opening extending along the longitudinal axis from the filament inlet end of the holding element for mounting of the optical filament with its filament end in front, whereby the filament is fastened in the opening by a fastening means.

The connection of light wave conductors, especially with a core/sheathing diameter of less than 400 micrometers, has several problems. Many relatively involved solution possibilities are already known for the connection problems. For example, the guiding of the filaments can take place by means of watch jewels, by four pins or by means of three ball bearings.

It is already known to use a guiding element made of plastic, which has an opening serving for mounting the optical filaments, whereby the opening ends in an extraordinarily accurate cast bore hole corresponding to the diameter of the filaments to be connected. However, a special guiding device is required for the different filament diameters and correspondingly a different casting tool is needed for its production.

SUMMARY OF THE INVENTION

In accordance with this invention, there is provided a guide device for mounting a filament of a light wave conductor, the device having an inlet opening extending along its longitudinal axis from an inlet end for mounting the filament with the filament end in front, the filament being adapted to be fastened in the inlet opening by a fastening device, characterized in that the inlet opening is provided with a contact surface forming an installation opening capable of receiving filaments of different diameters.

Also in accordance with this invention, there is provided a method of mounting filaments of a light wave conductor, comprising:

providing a guide device having an inlet opening extending along its longitudinal axis from an inlet end for mounting the filament with its filament end in front, the inlet opening being provided with a contact surface forming an installation opening capable of receiving filaments of different diameters, inserting a filament having a specified diameter and a filament end into the inlet opening of the guide device until the filament end contacts the contact surface at a location corresponding to the specified diameter of the filament, filling the inlet opening and the installation opening with a fastening means, and separating the guide device adjacent to the filament end to provide an optical terminating mating end for the conductor.

It can accordingly be seen that a single guide device can be provided in a low cost manner for accommodating filaments of the light wave conductor of different diameters and still provide an acceptable optical terminating end.

BRIEF DESCRIPTION OF THE DRAWINGS

FIG. 1 shows a cross section through a guide element according to the invention;

FIG. 2 shows a view of the guide element in FIG. 1 in the direction of arrow A;

FIG. 5 shows another light wave conductor-plug connection according to the invention with a guide element of the type shown in FIGS. 1 to 3.

FIG. 6 shows a front view of the plug according to FIG. 5.

FIG. 7 shows a light wave adapter, in which two plugs of the type shown in FIG. 5 can be inserted to produce a connection.

DESCRIPTION OF THE PREFERRED EMBODIMENTS

Figure 3:
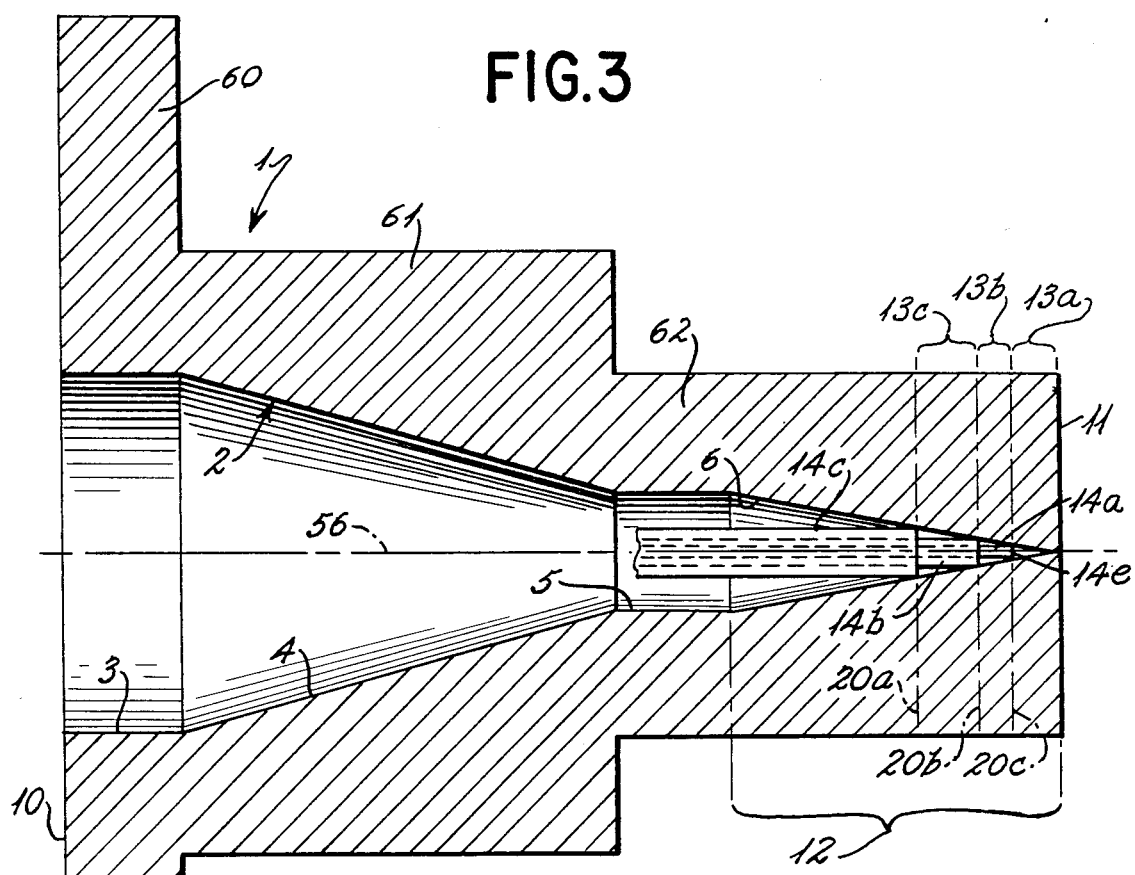
FIG. 3 shows an enlarged sectional view of the guide element similar to FIG. 1, whereby the filaments are shown schematically with three different diameters in their installation position.

The invention refers to a guide device 1 (see especially FIGS. 1 to 3) which according to the invention is made of plastic, and preferably by injection molding. The guide element 1 serves for the connection of a light wave conductor 55 (see FIG. 5). The light wave conductor 55 generally has a protective tube 18 surrounding filament 14. Preferably the guiding element 1 according to the invention is used for connection in the case of light wave conductor filaments from 100 to 400 μm.

Figure 4:
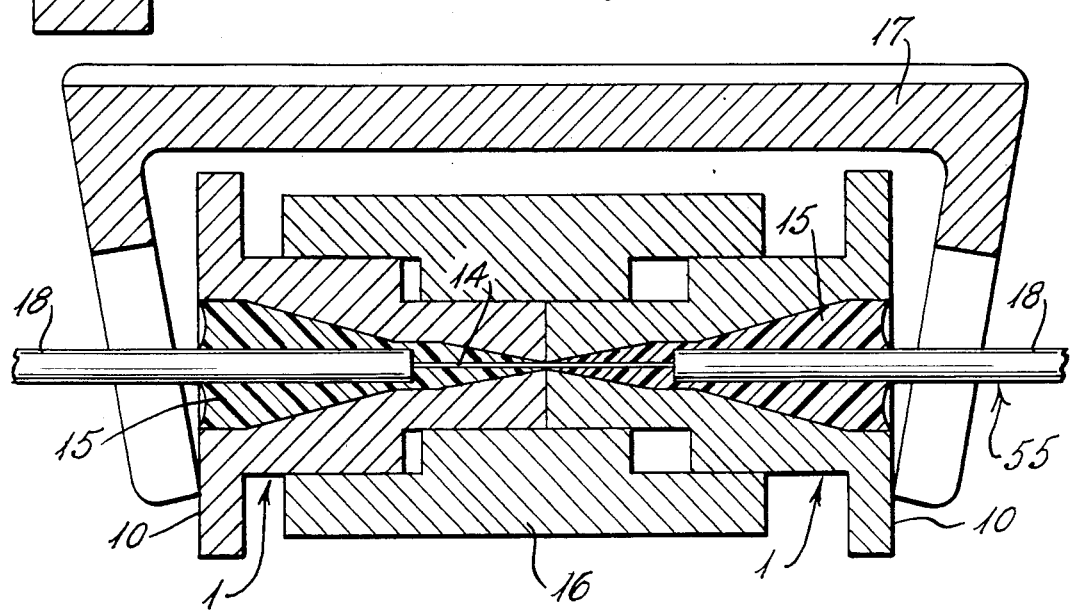
FIG. 4 shows a plug connection according to the invention, which uses two guide elements according to FIGS. 1 to 3.

The guide element 1 according to the invention can be used not only for plugs of the type shown in FIGS. 4 and 5, but it can also be used as round bodies for plugs, as described in U.S. Pat. No. 4,190,317. Generally, the guide element can serve as a holding element for mounting an optical filament.

The guide element 1 is also a one piece part made of plastic, which for example exhibits a first cylinder section 60, a second cylinder section 61 and a third cylinder section 62. An opening 2 serving to mount the filament 14 extends along the central lengthwise axis 56 of the guide element 1. Generally, the opening 2 tapers from the inlet end 10 of the guide element 1 to the terminal end 11 of the guide element 1. On the whole, one can designate the opening 2 as cone-shaped running from the inlet end 10 to the terminal end 11. So as to give the cone, which is formed by opening 2, sufficient stability, said opening 2 has a tapered shape starting at a first diameter section 40 and ending in a peak section 45 (see FIG. 1).

In the case of the shown design example, starting from the first diameter 40, a tapering takes place to a second diameter 41 and finally a second tapering to the mentioned peak 45. Thus the opening 2 exhibits a series of areas of opening sections, namely an inlet opening 3 with a first diameter 40, connected to a guide opening 4 of truncated cone shape and in turn connected to a connecting opening 5 of circular cylindrical form and with the second diameter 41. A cone shaped installation opening 6 is connected to connection opening 5, which ends in a point 45. The intake opening 3 is provided in the first cylinder section 60, the guide opening 4 is provided in the second cylinder section 61 and the connection opening 5 as well as the installation opening 6 is provided in the third cylinder section 62.

For filaments in the range from 100 μm to 400 μm, the total length of the guiding element for example amounts to 8.5 mm; the length of the first cylinder section 60 amounts to 1 mm, the length of the second cylinder section 61 amounts to 3.8 mm and the length of the third cylinder section 62 likewise amounts to 3.8 mm.

The walls of the truncated cone formed by the guide opening 4 runs at angle 43. For the already mentioned measuring data, the angle 43 has a size of about 15 degrees. The cone formed by the installation opening 6 has a wall surface running at angle 44, which in the given example amounts to about 10 degrees.

The angle size of the cone of the installation opening 6 need not be exactly adhered to. The only important thing is the adherence to the centricity deviation of the cone point 45 with respect to the outer edge 46 of the guide element 1.

It is especially shown schematically in FIG. 3 that the guide element 1 formed according to the invention can be used for mounting and holding of filaments 14 with the different diameters. The conditions for three filaments 14a, 14b and 14c are schematically shown in FIG. 3. The filaments 14a can for example have a diameter of 100 μm, the filaments 14b can have diameters of 200 μm and the filaments 114c can have diameters of 400 μm. Naturally, three filaments are not introduced simultaneously in practice.

It is recognized that in the shown example, cone-shaped intallation opening 6 provides the undesignated contact surfaces for the filaments 14a, 14b and 14c of different diameters. Preferably, the contact surface formed by the installation opening 6 is provided in such a way that only the fiber edge 114e (as this is shown only for the filaments 14a) comes to rest on the contact surface.

It is recognized in FIG. 3 that the cone-shaped opening 6 in the guide element 1 extends over a section 12 (installation section).

For example, if one wishes to fasten the filaments 14a in the guiding device 1, then, in the given case, after removal of the protective sheathing (as shown in FIG. 4) coming from the inlet end 10, the filaments are introduced into the installation opening 6 until the filament edge 14e comes to rest on the contact surface of the installation opening 6 exhibiting the corresponding diameter. Then the filaments are fastened together with the still remaining protective sheathing in the opening 2 by means of fastening medium. For example, a sealing compound 15 (FIG. 4) may be used as a fastening material. An epoxy resin or another glue can be used as a sealing compound. After hardening out of the sealing compound 15, the guide element 1 is polished off up to the filament 14a, that is to say the polishing off length 13a shown in FIG. 3 is removed. In the shown design example, this polishing off length is about 0.4 mm.

When the filaments 14b with the mean diameter are to be connected, then one proceeds in a similar manner as described, that is to say the filament 14b l is brought to rest position on the proper contact surface of installation opening 6. Following this, sealing compound 15 is poured in again in order to take away the polishing lengths 13a plus 13b of a total of about 0.7 mm length after its hardening out. At the connection of a fiber 14c with the larger shown diameter, after hardening out of the sealing compound 15 a polishing off length of 13a plus 13b plus 13c is removed, which in the shown design example corresponds to about the length of 1.2 mm.

In order not to make the tool production too difficult (angular accuracy), the polishing off length 13a, 13b and 13c for each filament would be first determined experimentally. Suitable polishing tools can be made of plastic. Due to the fact that the guide element 1 is a plastic cast part, with a series manufacture, not only is the parts price extremely low, there is also the advantage that different colors can be molded to indicate filament thickness.

FIG. 4 shows a light wave conductor-plug which is designed with the use of a guide element according to FIG. 1 to FIG. 3. The embodiment shown uses a light wave conductor 55 with a 100 μm filament 14, and without stress relief. The filaments 14 and protective tube 18 are fastened in the guide element 1 by a sealing compound 15 in the already mentioned way. The centering of the two guide elements 1 is accomplished by means of an adapter 16 formed of plastic, which exhibits a bore hole, which in the shown manner is designed complementary to the second and third cylindrical sections 61, 62 of the guide element. The plastic adapter 16 is designed in such a way that a snug fit comes about with the setting in of the guide element, that is to say the elasticity of the plastic of the adapter 16 and/or of the guide element 1 is utilized. The two light wave conductor plugs formed by the guide element 1 are held together by a plastic spring 17 which equilizes the lengths of the guide elements 1 dependent on filament thickness.

Another light wave conductor plug 21 is shown in FIGS. 5 and 6 which is to be coupled by means of an adapter 32 shown in FIG. 7 with another light wave conductor 21 of the same kind.

The plug 21 exhibits two half shells 22, 23 forming a hollow chamber, which hold the guide element 1 by means of inwardly extending stops 24. Plug 21 is pressed against stops 24 by a spring 25. The half shells 22, 23 taper to the left in FIG. 5 to casing parts 26 which take up the protective tube 18 in a lengthwise stretched opening.

Furthermore, the fiber optic cable shown here exhibits a braid 27 surrounding the protective tube 18, whereby the braid 27 is surrounded by an outside sheathing 28. In the area of the casing parts 26, the braid 27 is exposed, in order to be crimped between the crimp casing 29 and the casing parts 26 for the purpose of stress relief. A bent protection 30 in the form of a rubber part or shrink hose surrounds the crimp casing 29 and in FIG. 5 lies to the right of the crimp casing on the casing parts 26 as well as with the opposite end on the outer sheathing 28.

I claim:

1. A guide device for mounting a filament of a light wave conductor, said device having an inlet opening extending along its longitudinal axis from an inlet end for mounting the filament with its filament end in front, the filament being adapted to be fastened in the inlet opening by a fastening device, characterized in that the inlet opening is provided with a contact surface forming an installation opening of varying size shaped to receive filaments of different diameters, said contact surface having along its length at a portion thereof a width less than the diameter of the smallest filament to be mounted by said guide device, and having a shape such that said filament will abut said contact surface at some point along the length of said contact surface in precisely centered relationship relative to said inlet opening when said filament is inserted thereinto.

2. The guide device of claim 1 wherein the installation opening is cone-shaped.

3. The guide device of claim 2 wherein the inlet opening is tapered away from the inlet end.

4. The guide device of claim 3 wherein said inlet opening is tapered in gradations.

5. The guide device of claim 4 wherein said inlet opening has a truncated cone shape in the direction of the taper and said installation opening has a truncated cone shape, the walls of which are adapted to contact edges of the filament end.

6. The guide device of claim 5 wherein said device is formed of a plastic material.

7. The guide device of claim 6 wherein said installation opening terminates at a point, said point being located within said guide device.

8. The guide device of claim 7 wherein said inlet opening has an outwardly extending first section including a cylindrically shaped opening and an inwardly extending second section which defines said truncated cone shape.

9. A method of mounting filaments of a light wave conductor, comprising:
providing a guide device having an inlet opening extending along its longitudinal axis from an inlet end for mounting the filament with its filament end in front, said inlet opening being provided with a contact surface forming an installation opening capable of receiving filaments of different diameters and being of such a shape that when a filament is inserted into said inlet opening, the end of said filament will abut said contact surface at some point along the length of said contact surface in precisely centered relationship relative to said inlet opening when said filament is inserted thereinto,
inserting a filament having a specified diameter and a filament end into said inlet opening of said guide device until the filament end contacts said contact surface at a location corresponding to said specified diameter of said filament,
filling said inlet opening and said installation opening with a fastening means, and separating said guide device adjacent to said filament end to provide an optical terminating mating end for said conductor whereby said filament is securely held in precisely centered relationship with respect to said guide device.

10. The method of claim 9 wherein said fastening means comprises a hardenable sealing compound and including the step of hardening said compound prior to separating said guide device.

11. The method of claim 10 wherein said guide device is formed of a plastic material, said inlet opening and said installation opening having truncated cone shapes, and wherein said step of separating comprises polishing off the terminal end of the guide material up to said filament end.

12. The method of claim 11 wherein said contact surface has along its length, said contact surface having along its length a width less than the diameter of the smallest filament to be mounted by said guide device, whereby said filament will abut said contact surface at some point along the length of said contact surface.

13. The method of claim 10 wherein said filament is provided with a protective outer layer and wherein said sealing compound surrounds said protective layer in the inlet opening and said filament in said installation opening.

* * * * *